(12) United States Patent
Mahalingam et al.

(10) Patent No.: US 8,030,886 B2
(45) Date of Patent: Oct. 4, 2011

(54) THERMAL MANAGEMENT OF BATTERIES USING SYNTHETIC JETS

(75) Inventors: Raghavendran Mahalingam, Austin, TX (US); Ari Glezer, Atlanta, GA (US)

(73) Assignee: Nuventix, Inc., Austin, TX (US)

( * ) Notice: Subject to any disclaimer, the term of this patent is extended or adjusted under 35 U.S.C. 154(b) by 1288 days.

(21) Appl. No.: 11/641,473

(22) Filed: Dec. 19, 2006

(65) Prior Publication Data
US 2007/0141453 A1 Jun. 21, 2007

Related U.S. Application Data

(60) Provisional application No. 60/753,074, filed on Dec. 21, 2005.

(51) Int. Cl.
*H02J 7/00* (2006.01)
*H02J 7/04* (2006.01)

(52) U.S. Cl. .................... 320/107; 320/150

(58) Field of Classification Search .......... 320/107, 320/150
See application file for complete search history.

(56) References Cited

U.S. PATENT DOCUMENTS

| | | |
|---|---|---|
| 3,464,672 A | 9/1969 | Massa |
| 4,031,171 A | 6/1977 | Asao et al. |
| 4,170,244 A | 10/1979 | Bernaerts |
| 4,238,425 A | 12/1980 | Matsuoka |
| 4,257,224 A | 3/1981 | Wygnanski et al. |
| 4,350,838 A | 9/1982 | Harrold |
| 4,406,323 A | 9/1983 | Edelman |
| 4,498,851 A | 2/1985 | Kolm et al. |
| 4,501,319 A | 2/1985 | Edelman et al. |
| 4,533,082 A | 8/1985 | Maehara et al. |
| 4,590,399 A | 5/1986 | Roxlo et al. |
| 4,590,970 A | 5/1986 | Mott |
| 4,595,338 A | 6/1986 | Kolm et al. |
| 4,664,345 A | 5/1987 | Lurz |
| 4,667,877 A | 5/1987 | Yao et al. |
| 4,693,201 A | 9/1987 | Williams et al. |
| 4,697,116 A | 9/1987 | Nakamura et al. |
| 4,697,769 A | 10/1987 | Blackwelder et al. |
| 4,708,600 A | 11/1987 | AbuJudom, II et al. |
| 4,727,930 A | 3/1988 | Bruckner et al. |
| 4,763,225 A | 8/1988 | Frenkel et al. |
| 4,780,062 A | 10/1988 | Yamada et al. |
| 4,802,642 A | 2/1989 | Mangiarotty |
| 4,923,000 A | 5/1990 | Nelson |

(Continued)

FOREIGN PATENT DOCUMENTS
EP 0 385 090 1/1990
(Continued)

OTHER PUBLICATIONS

Chapter 6.6: Compact Ultrasonic Air Transducer; http://www.globalspec.com; Sep. 14, 2006; 11 pages.

(Continued)

*Primary Examiner* — M'Baye Diao
(74) *Attorney, Agent, or Firm* — John A. Fortkort; Fortkort & Houston P.C.

(57) ABSTRACT

A thermally managed power source (201) is provided herein which comprises a first battery module (203), and a first synthetic jet ejector (215) disposed on a surface of said first battery module and being adapted to direct a plurality of synthetic jets along a surface (211) of said first battery module.

15 Claims, 11 Drawing Sheets

U.S. PATENT DOCUMENTS

| | | |
|---|---|---|
| 4,930,701 A | 6/1990 | Porter et al. |
| 4,930,705 A | 6/1990 | Broerman |
| 4,932,610 A | 6/1990 | Maestrello |
| 4,938,279 A | 7/1990 | Betker |
| 4,938,742 A | 7/1990 | Smits |
| 4,939,405 A | 7/1990 | Okuyama et al. |
| 4,941,398 A | 7/1990 | Morris et al. |
| RE33,448 E | 11/1990 | Bauer |
| 4,969,802 A | 11/1990 | Merrigan et al. |
| 4,976,311 A | 12/1990 | Kurzweg |
| 4,989,810 A | 2/1991 | Meier et al. |
| 5,008,582 A | 4/1991 | Tanuma et al. |
| 5,034,688 A | 7/1991 | Moulene et al. |
| 5,040,560 A | 8/1991 | Glezer et al. |
| 5,083,194 A | 1/1992 | Bartilson |
| 5,107,398 A | 4/1992 | Bailey |
| 5,137,079 A | 8/1992 | Anderson |
| 5,142,260 A | 8/1992 | House |
| 5,154,347 A | 10/1992 | Vijay |
| 5,156,306 A | 10/1992 | Perera |
| 5,165,243 A | 11/1992 | Bennett |
| 5,183,104 A | 2/1993 | Novotney |
| 5,190,099 A | 3/1993 | Mon |
| 5,199,640 A | 4/1993 | Ursic |
| 5,199,856 A | 4/1993 | Epstein et al. |
| 5,209,438 A | 5/1993 | Wygnanski |
| 5,226,597 A | 7/1993 | Ursic |
| 5,242,110 A | 9/1993 | Riley |
| 5,251,817 A | 10/1993 | Ursic |
| 5,303,555 A | 4/1994 | Chrysler et al. |
| 5,316,075 A | 5/1994 | Quon et al. |
| 5,335,143 A | 8/1994 | Maling, Jr. et al. |
| 5,346,745 A | 9/1994 | Bandyopadhyay |
| 5,361,989 A | 11/1994 | Merchat et al. |
| 5,395,592 A | 3/1995 | Bolleman et al. |
| 5,402,312 A | 3/1995 | Kinjo et al. |
| 5,411,208 A | 5/1995 | Burgener |
| 5,419,780 A | 5/1995 | Suski |
| 5,429,302 A | 7/1995 | Abbott |
| 5,437,421 A | 8/1995 | Nosenchuck et al. |
| 5,493,615 A | 2/1996 | Burke et al. |
| 5,516,043 A | 5/1996 | Manna et al. |
| 5,558,156 A | 9/1996 | Tsutsui |
| 5,595,205 A | 1/1997 | Sirovich et al. |
| 5,681,152 A | 10/1997 | Aha |
| 5,758,823 A | 6/1998 | Glezer et al. |
| 5,791,601 A | 8/1998 | Dancila et al. |
| 5,797,414 A | 8/1998 | Sirovich et al. |
| 5,798,465 A | 8/1998 | Ziada et al. |
| 5,857,619 A | 1/1999 | Huang et al. |
| 5,861,703 A | 1/1999 | Losinski |
| 5,873,408 A | 2/1999 | Bellet et al. |
| 5,876,187 A | 3/1999 | Afromowitz |
| 5,881,954 A | 3/1999 | Holm |
| 5,894,990 A | 4/1999 | Glezer et al. |
| 5,901,037 A | 5/1999 | Hamilton et al. |
| 5,921,757 A | 7/1999 | Tsutsui et al. |
| 5,957,413 A | 9/1999 | Glezer et al. |
| 5,983,944 A | 11/1999 | Niv |
| 5,988,522 A | 11/1999 | Glezer et al. |
| 5,996,903 A | 12/1999 | Asai et al. |
| 5,997,671 A | 12/1999 | Takeuchi et al. |
| 6,016,969 A | 1/2000 | Tilton et al. |
| 6,032,464 A | 3/2000 | Swift et al. |
| 6,056,204 A | 5/2000 | Glezer et al. |
| 6,059,020 A | 5/2000 | Jairazbhoy et al. |
| 6,109,222 A | 8/2000 | Glezer et al. |
| 6,123,145 A | 9/2000 | Glezer et al. |
| 6,137,891 A | 10/2000 | Porrazzo et al. |
| 6,186,748 B1 | 2/2001 | Umeda et al. |
| 6,247,525 B1 | 6/2001 | Smith et al. |
| 6,280,148 B1 | 8/2001 | Zengerle et al. |
| 6,315,215 B1 | 11/2001 | Gipson et al. |
| 6,333,852 B1 | 12/2001 | Lin |
| 6,405,794 B1 | 6/2002 | Kim et al. |
| 6,412,732 B1 | 7/2002 | Amitay et al. |
| 6,440,212 B1 | 8/2002 | Hayes |
| 6,451,175 B1 | 9/2002 | Lal |
| 6,457,654 B1 | 10/2002 | Glezer et al. |
| 6,458,618 B1 | 10/2002 | Allen et al. |
| 6,475,658 B1 | 11/2002 | Pedicini et al. |
| 6,481,984 B1 | 11/2002 | Shinohara et al. |
| 6,554,607 B1 | 4/2003 | Glezer et al. |
| 6,588,497 B1 | 7/2003 | Glezer et al. |
| 6,628,522 B2 | 9/2003 | Trautman et al. |
| 6,629,425 B2 | 10/2003 | Vaiyapuri |
| 6,631,077 B2 | 10/2003 | Zuo |
| 6,644,598 B2 | 11/2003 | Glezer et al. |
| 6,650,542 B1 | 11/2003 | Chrysler et al. |
| 6,668,911 B2 | 12/2003 | Bingler |
| 6,669,115 B2 | 12/2003 | Sun et al. |
| 6,710,577 B1 * | 3/2004 | Shum ............................. 320/112 |
| 6,722,581 B2 | 4/2004 | Saddoughi |
| 6,725,670 B2 | 4/2004 | Smith et al. |
| 6,759,159 B1 | 7/2004 | Gray et al. |
| 6,801,430 B1 | 10/2004 | Pokharna |
| 6,809,928 B2 | 10/2004 | Gwin et al. |
| 6,817,204 B2 | 11/2004 | Bash et al. |
| 6,824,915 B1 | 11/2004 | Pedicini |
| 6,843,310 B1 | 1/2005 | Chen |
| 6,848,631 B2 | 2/2005 | Monson et al. |
| 6,937,472 B2 | 8/2005 | Pokhama |
| 6,949,309 B2 * | 9/2005 | Moores et al. .................. 429/50 |
| 6,967,464 B2 * | 11/2005 | Heigl et al. .................... 320/107 |
| 6,988,706 B2 | 1/2006 | Seeley |
| 7,023,697 B2 | 4/2006 | Pokharna et al. |
| 7,039,213 B2 | 5/2006 | Hyre et al. |
| 7,055,329 B2 | 6/2006 | Martens et al. |
| 7,092,254 B1 | 8/2006 | Monsef et al. |
| 7,211,347 B2 * | 5/2007 | Sugiura et al. ................ 429/120 |
| 2002/0098097 A1 | 7/2002 | Singh |
| 2003/0043531 A1 | 3/2003 | Trautman et al. |
| 2003/0075615 A1 | 4/2003 | Saddoughi |
| 2003/0110788 A1 | 6/2003 | Koeneman et al. |
| 2003/0133587 A1 | 7/2003 | Hyre et al. |
| 2003/0177899 A1 | 9/2003 | Monson et al. |
| 2004/0125561 A1 | 7/2004 | Gwin et al. |
| 2004/0231341 A1 | 11/2004 | Smith |
| 2005/0013116 A1 | 1/2005 | Pokharna et al. |
| 2005/0031137 A1 | 2/2005 | Browning et al. |
| 2005/0074662 A1 | 4/2005 | Cho et al. |
| 2005/0105757 A1 | 5/2005 | Tummire et al. |
| 2005/0111185 A1 | 5/2005 | Bhattacharya et al. |
| 2005/0163338 A1 | 7/2005 | Ohashi |
| 2005/0284612 A1 | 12/2005 | Machiroutu |
| 2006/0016581 A1 | 1/2006 | Wang et al. |
| 2006/0022092 A1 | 2/2006 | Miller et al. |
| 2006/0145027 A1 | 7/2006 | Warsop et al. |
| 2006/0164805 A1 | 7/2006 | Meinders et al. |

FOREIGN PATENT DOCUMENTS

| | | |
|---|---|---|
| JP | 10-047254 | 2/1998 |
| JP | 2001-355574 | 12/2001 |
| JP | 2005-264811 | 9/2005 |
| SU | 1274165 A1 | 1/1984 |
| WO | WO 99/26457 | 11/1998 |
| WO | WO 02/72421 | 3/2002 |
| WO | WO 2005/008348 | 7/2004 |
| WO | WO 2005/090789 | 2/2005 |

OTHER PUBLICATIONS

Manger, Daniela L., "A sound transducer with a flat, flexible diaphragm working with bending waves"; Manger Products, Mellrichstadt, Germany; 4 pages.

Flomerics May 1998 Article 3.htm; Electronics Cooling; Thermal management of handheld telecommunication products; www.electronics-cooling.com/Resources/EC_Articles/May98/article3.htm; Mar. 24, 2005; 7 pages.

Georgia Institute of Technology, Package Research Center; e-newsletter, vol. 1, Issue 6, Dec. 2004; "Single Phase Pumped Flow Loop with a Stacked Microchannel Heat Sink"; www.prc.gatech.edu/newsletter/dec2004.htm; Jul. 16, 2005; 9 pages.

Toon, John, GT Research Horizons, Winter 2004; "Keeping Cool, Synthetic jet and droplet atomization technologies meet broad range of electronic thermal management needs"; http://gtresearchnews.gatech.edu/reshor/rh-w04/fluidics.html; Aug. 4, 2005; 4 pages.

Heffington, S. and Glezer, A., "Enhanced Boiling Heat Transfer by Submerged Ultrasonic Vibrations"; George W. Woodruff School of Mechanical Engineering, Georgia Institute of Technology, Atlanta, Georgia; Sep. 29-Oct. 1, 2004; 5 pages.

Harris, Tom, "How Speakers Work"; How Stuff Works; http://electronics.howstuffworks.com/speaker.htm; May 17, 2006, 31 pages.

Arik, Mehmet, White Paper, "Local Heat Transfer Coefficients of a High Frequency Synthetic Jet During Impingement Cooling Over Flat Surfaces"; GE Global Research Ctr., 19 pgs.

Innovative Techniques to Obtain Heat Transfer Coefficient and Film Effectiveness; Design Considerations for Rugged Enclosures; http://www.afrlhorizons.com/ETB/ETBriefs/Oct05; Dec. 9, 2005; 4 pages.

InTech, ISA—The Instrumentation, Systems, and Automation Society; "Synthetic jet, atomization keep it cool"; Dec. 3, 2003; www.isa.org/InTechTemplate.cfm Aug. 4, 2005; 2 pgs.

Bash, Cullen E et al.; "Acoustic Compression for theThermal Management of Multi-Load Electronic Systems"; White Paper; Hewlett-Packard Laboratories; 8 pages.

Wang, Evelyn N. et al.; "Micromachined Jets for Liquid Impingement Cooling of VLSI Chips"; Journal of Microelectromechanical Systems, vol. 13, No. 5, Oct. 2004; 10 pages.

Linderman, Ryan J. et al., "The Resonant Micro Fan for Fluidic Transport, Mixing and Particle Filtering"; Proceedings of 2001 ASME International Mechanica Engineering Congress and Exposition, Nov. 11-16, 2001, New York, NY; 8 pages.

Suzuki, Hiroaki et al., "Manipulation of a Round Jet with Electromagnetic Flap Actuators"; IEEE MEMS ;99, Orlando, Florida, Jan. 1999; 7 pages.

Ho, Chih-Ming and Tai, Yu-Chong; Micro-Electro-Mechannical-Systems (MEMS) and Fluid Flows; Annu. Rev. Fluid . Mich. 1998, 30:579-612.

Kercher, Dan S. et al.; "Microjet Cooling Devices for Thermal Management of Electronics"; http:/www.utdallas.edu; Mar. 24, 2005, 4 pages.

Li, Shuo and Smith, Marc K.; "Numerical Study of the Micro Synthetic Jet and Its Application to Thermal Management in Microelectronics"; http://www.me.gatech.edu/fluids/projects/smith/li.htm; Sep. 12, 2006; 2 pages.

Nemeth, Jackie; "Microjet Integration, New microjet allows for easy integration into electronic devices"; Research Horizons, http://www.gtresearchnews.gatech.edu/reshor/rh-spr98/mjet.html; Sep. 12, 2006; 2 pages.

Science Daily: Synthetic Jet and Droplet Atomization Technologies Help Electronic Devices Keep Cool; www.sciencedaily.com/releases/2003; Sep. 12, 2006; 4 pages.

Tillery, Steven W. et al.; "Boiling Heat Transfer Enhancement by Submerged, Vigration-Induced Jets"; White paper; George W. Woodruff School of Mech. Engineering; 15 pages.

Daniels, Christopher et al.; "Nonlinear Oscillations and Flow of Gas Within Closed and Open Conical Resonators"; NASA/TM-2004-212902; AIAA-2004-0677; Prepared for the 42nd Aerospace Sciences Meeting and Exhibit; Reno, Nevada, Jan. 5-8, 2004; Feb. 2004; 12 pages.

Davis, Sam; "Turn Down the Heat, Please!"; electronic design; www.elecdesign.com/Articles/Index.cfm; Mar. 17, 2005; 5 pages.

PI Ceramic; "PICA-Stack Piezoceramic Actuators Versatile Piezoelectric Power"; www.piceramic.com; 2006; 3 pages.

* cited by examiner

THERMAL MANAGEMENT OF BATTERIES USING SYNTHETIC JETS

CROSS REFERENCE TO RELATED APPLICATION

The present application claims priority from U.S. Provisional Application Ser. No. 60/753,074 entitled "THERMAL MANAGEMENT OF BATTERIES USING SYNTHETIC JETS", which was filed on Dec. 21, 2005, and which is incorporated herein by reference in its entirety.

FIELD OF THE DISCLOSURE

The present disclosure relates generally to thermal management systems, and more specifically to thermal management systems adapted for use in cooling battery modules disposed in laptop computers and other portable or handheld electronic devices.

BACKGROUND OF THE DISCLOSURE

The thermal management of laptop computers and other portable or handheld electronic devices has become increasingly challenging as these devices have become more powerful, while at the same time decreasing in size and weight. In particular, acceptable thermal management solutions for these devices are subject to stringent size and weight constraints, and yet must dissipate a sufficient amount of thermal energy to maintain the components and external surfaces of the device within suitable operating and ergonomic temperature ranges, respectively.

Battery modules have emerged as a particularly challenging component of electronic devices from a thermal management perspective. As portable and hand-held devices have become more powerful, battery modules are required to provide increasing power loads, and have also become more compact. Consequently, battery modules have evolved into increasingly intense hot spots within such devices.

Unfortunately, the placement of battery modules in laptops and handheld devices frequently makes them inaccessible to conventional thermal management schemes that rely on global forced air flow through the device. In particular, the battery module is often sealed off from other components of the device to protect those components in the event of battery leakage. Moreover, since the operation of batteries is typically exothermic, it is necessary to shield the components of a device from the heat generated by the battery module. On the other hand, conventional thermal management systems that rely on convection currents generally provide an insufficient level of heat dissipation to be suitable for this application.

The use of fan-based systems is a common global thermal management solution for desk top computers and other large electronic devices. However, the use of fans is precluded in many portable or handheld electronic devices due to the size and weight constraints noted above, and is also unfavorable from an acoustical perspective. Moreover, even in larger portable electronic devices such as laptops where these constraints are less stringent and where small fan units can be utilized to provide global cooling, these units generally provide insufficient heat dissipation for battery modules and other intense hotspots within the device.

SUMMARY OF THE DISCLOSURE

In one aspect, a thermally managed power source is provided herein. The power source comprises a first battery module, and a first synthetic jet ejector adapted to direct a plurality of synthetic jets along a surface of said first battery module.

In another aspect, a battery charger is provided which comprises (a) a base having a synthetic jet ejector disposed therein; (b) a platform supported on said base; and (c) a charging station incorporated into said platform, said charging station having a first major surface which is adapted to receive and charge at least one battery; wherein said charging station is powered by electrical circuitry disposed in said base, and wherein said synthetic jet ejector is adapted to direct a plurality of synthetic jets along a surface of said base.

These and other aspects of the present disclosure are described in greater detail below.

DETAILED DESCRIPTION

Figure 1:
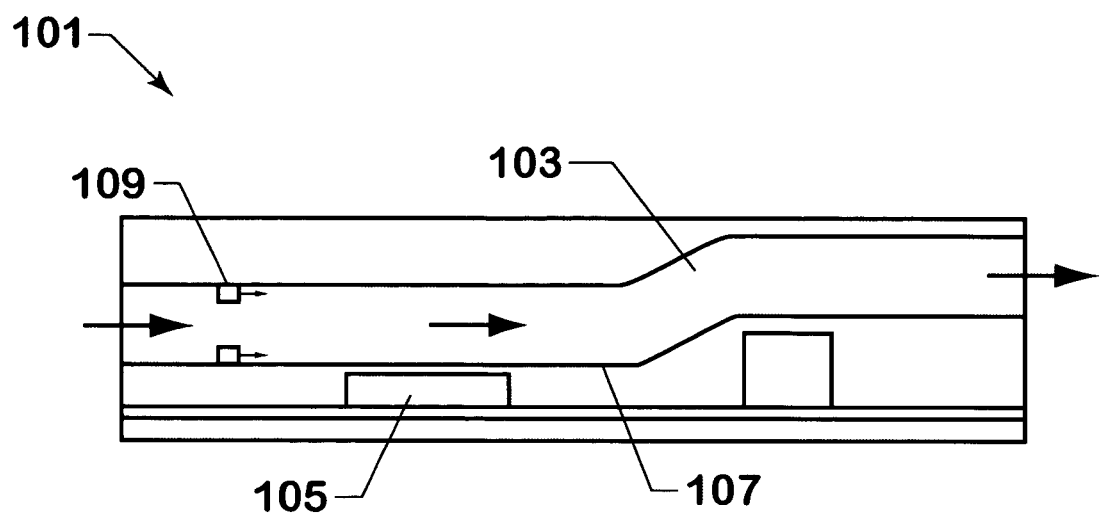
FIG. 1 is an illustration of a prior art thermal management system based on the use of synthetic jet ejectors.

More recently, thermal management systems have been developed which are based on synthetic jet ejectors. These systems are more energy efficient than comparable fan-based systems, and have the ability to provide localized spot cooling. Systems of this type, an example of which is depicted in FIG. 1, are described in greater detail in U.S. Pat. No. 6,588,497 (Glezer et al.).

The system depicted in FIG. 1 utilizes an air-cooled heat transfer module 101 which is based on a ducted heat ejector (DHE) concept. The module utilizes a thermally conductive, high aspect ratio duct 103 that is thermally coupled to one or more IC packages 105. Heat is removed from the IC packages

105 by thermal conduction into the duct shell 107, where it is subsequently transferred to the air moving through the duct. The air flow within the duct 103 is induced through internal forced convection by a pair of low form factor synthetic jet ejectors 109 which are integrated into the duct shell 107. In addition to inducing air flow, the turbulent jet produced by the synthetic jet ejector 109 enables highly efficient convective heat transfer and heat transport at low volume flow rates through small scale motions near the heated surfaces, while also inducing vigorous mixing of the core flow within the duct.

While systems of the type depicted in FIG. 1 have many unique advantages, there is nonetheless a need in the art for thermal management systems that are adapted to address the particular needs of battery modules. These and other needs are met by the devices and methodologies disclosed herein.

It has now been found that the aforementioned needs can be met through the provision of one or more synthetic jet ejectors in combination with a battery module. The synthetic jet ejectors may be utilized in combination with various channeling techniques that ensure adequate heat dissipation, a low form factor, and acceptable mass, while maintaining the external surfaces of a device incorporating the battery module within an ergonomically acceptable range. The use of synthetic jet ejectors in combination with various channeling techniques may be used to further ensure that the components of the battery module are maintained at a proper operating temperature. The means by which these objectives may be accomplished are described in greater detail below.

Figure 2:
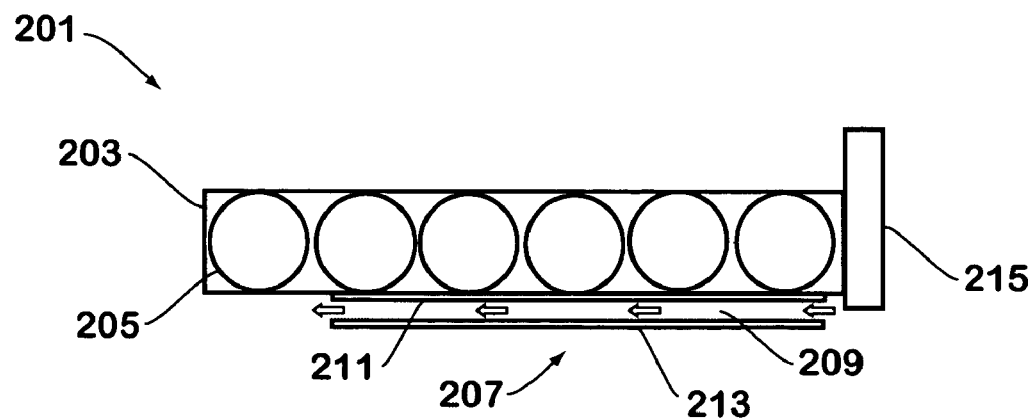
FIG. 2 is a front view of a battery module equipped with a thermal management system of the type described herein.
Figure 3:
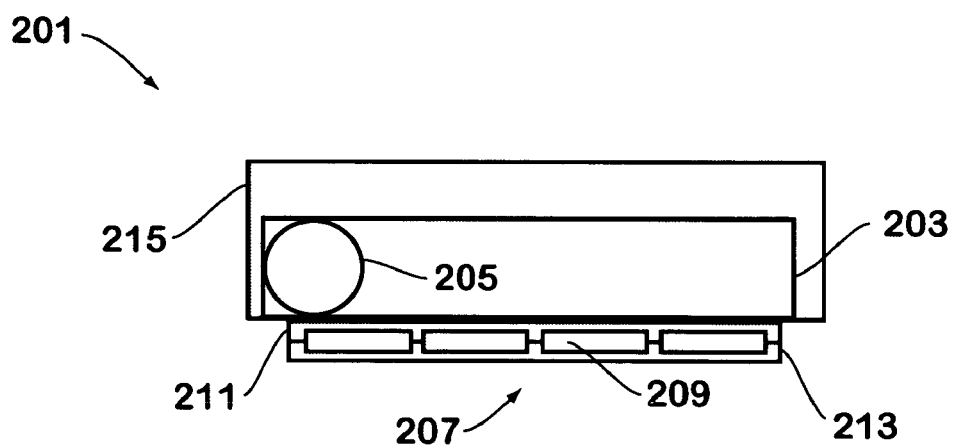
FIG. 3 is a side view of the device of FIG. 2.
Figure 4:
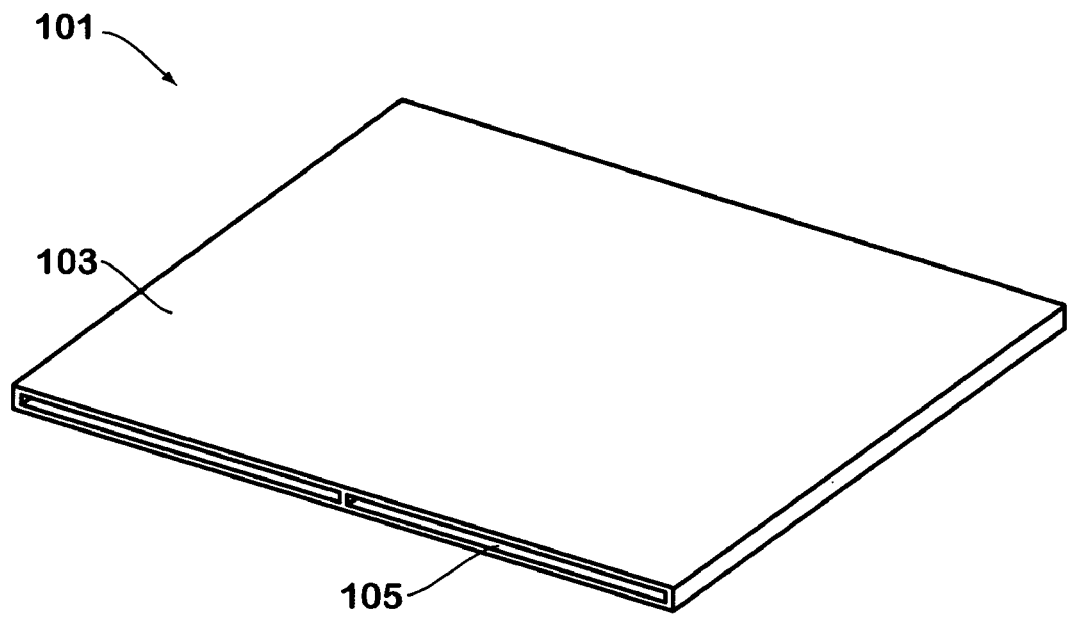
FIG. 4 is an illustration of a case having two channels defined therein.
Figure 5:
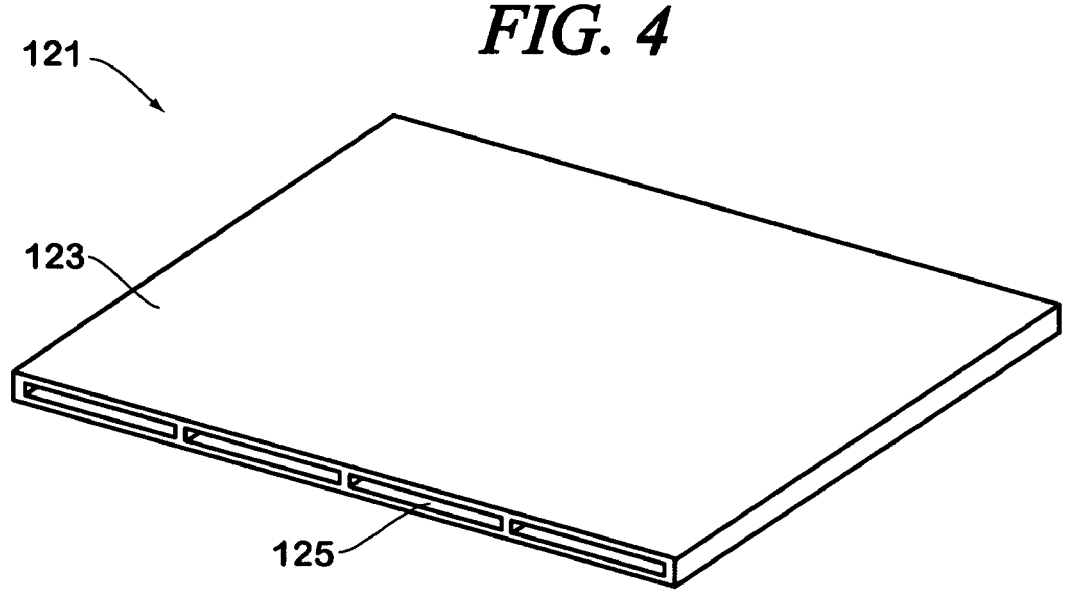
FIG. 5 is an illustration of a case having four channels defined therein.
Figure 6:
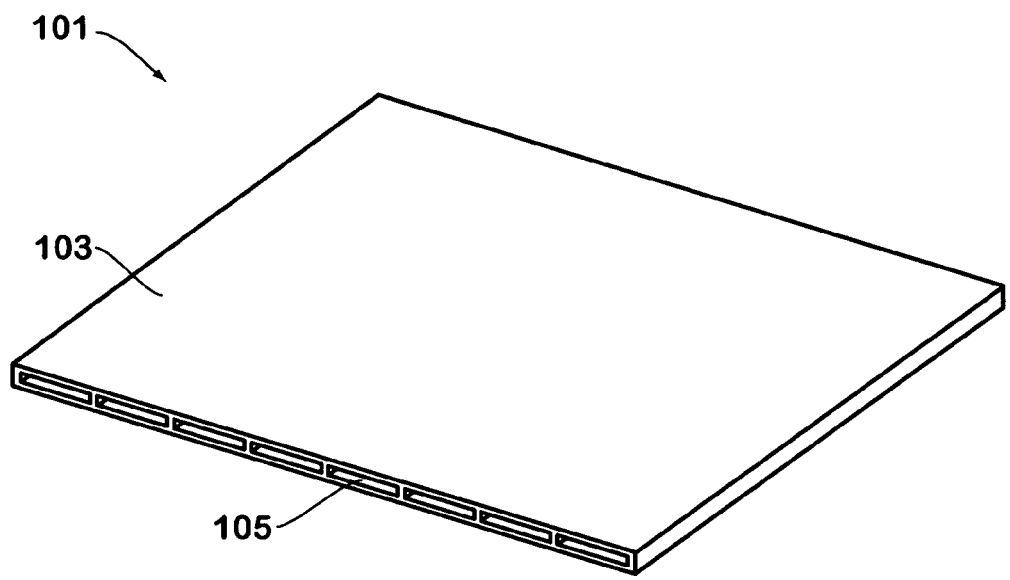
FIG. 6 is an illustration of a case having eight channels defined therein.
Figure 7:
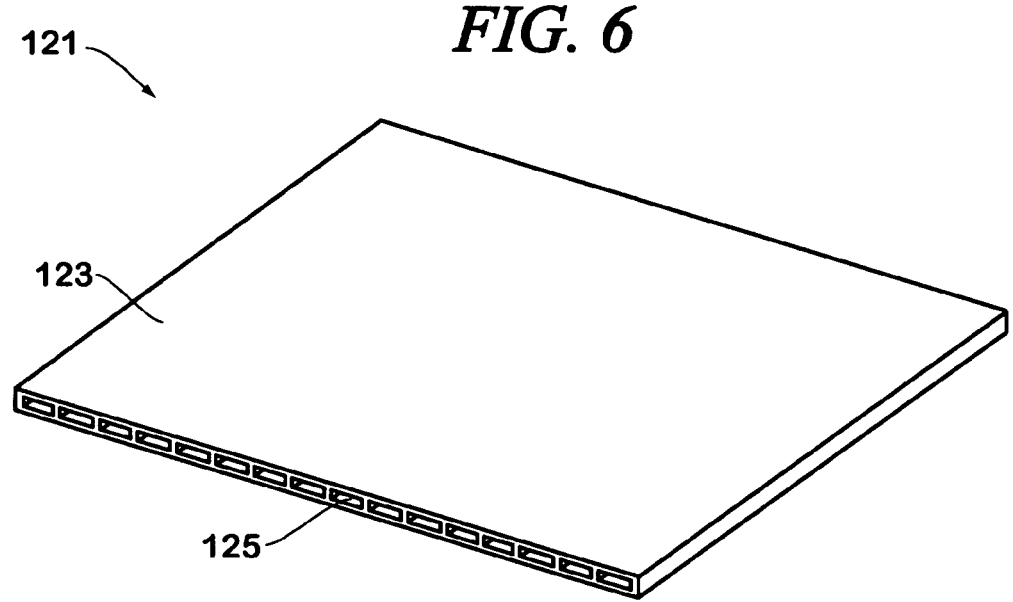
FIG. 7 is an illustration of a case having sixteen channels defined therein.

FIGS. 2-3 illustrate a first particular, non-limiting embodiment of a thermal management system in accordance with the teachings herein which is suitable for use in dissipating heat from a battery module. The system 201 depicted therein comprises a battery module 203 which contains one or more batteries 205. A heat exchanger 207 is provided which is adjacent to the batteries 205 and/or battery module 203 and which contains one or more conduits 209 for the flow of a fluid therethrough. The heat exchanger 207 may form part of the battery module 203, or may be a component of a device which incorporates the battery module 203. Thus, for example, the heat exchanger 207 may be a portion of (or may be embedded into) the casing of a laptop computer or handheld electronic device which is adjacent to the battery module 203.

Preferably, the heat exchanger 207 comprises an interior component 211 which is thermally conductive and which is in thermal contact with the battery module 203 and/or the batteries 205, and an exterior component 213 which is thermally non-conductive. The interior component 211 may comprise, for example, aluminum, copper, graphite, or other materials (including various metal alloys and metal filled polymeric compositions) having suitable thermal conductivity, while the exterior surface may comprise, for example, various thermally insulating plastics and other thermally non-conductive materials as are known to the art.

As seen in FIG. 3, the heat exchanger 207 is preferably constructed with a plurality of segregated conduits 209 or channels that are in fluidic communication with a synthetic jet ejector 215. The synthetic jet ejector 215 is preferably adapted to direct at least one synthetic jet into each channel 209. The use of focused synthetic jets in this application is found to have several advantages.

First of all, the flow rates of fluid achievable through the channels 209 with conventional global circulation systems is typically much lower than the rates achievable through the use of synthetic jets, due to the pressure drop created by the channel walls. This problem worsens as the cross-sectional channel dimensions become increasingly smaller. Indeed, at the dimensions typically imposed on thermal management systems by size constraints in portable or handheld electronic devices, the pressure drop is severe enough that these systems typically cannot provide adequate heat dissipation. The use of focused jets to direct a stream of fluid into the channels overcomes this problem by reducing this pressure drop, and hence facilitates increased entrainment of the flow of fluid into the channels.

The use of focused jets in the thermal management systems described herein also significantly improves the efficiency of the heat transfer process. Under conditions in which the fluid is in a non-boiling state, the flow augmentation provided by the use of synthetic jet ejectors increases the rate of local heat transfer in the channel structure, thus resulting in higher heat removal. Under conditions in which the fluid is in a boiling state (as may be the case, for example, if low boiling liquid coolants are utilized in the channels 209), these jets induce the rapid ejection of vapor bubbles formed during the boiling process. This rapid ejection dissipates the insulating vapor layer that would otherwise form along the surfaces of the channels, and hence delays the onset of critical heat flux. In some applications, the synthetic jets may also be utilized to create beneficial nucleation sites to enhance the boiling process.

One skilled in the art will also appreciate that the channels 209 in the devices of FIGS. 2-3 may take a variety of forms. For example, although the channels 209 are depicted as being essentially rectangular in cross-section in the embodiment shown therein, in other embodiments, they may be elliptical, circular, square, hexagonal, polygonal, or irregular in cross-section. Also, in some embodiments, the channels may be formed as an open-celled material. In various embodiments, the channels may also be convoluted to increase the residence time of fluid in the channels.

The number of channels in the heat exchanger 207 may also vary. The optimal choice for a particular application may depend, for example, on such factors as the space available, the amount of heat to be dissipated, and other such factors. Some possible examples are depicted in FIGS. 4-7. Thus, in the device 301 depicted in FIG. 4, the heat exchanger is segregated into 2 channels 303, each having a width of about 45 mm. In the device 321 depicted in FIG. 5, the heat exchanger is segregated into 4 channels 323, each having a width of about 22 mm. In the device 341 depicted in FIG. 6, the heat exchanger is segregated into 8 channels 343, each having a width of about 11 mm. In the device 361 depicted in FIG. 7, the heat exchanger is segregated into 16 channels 363, each having a width of about 5 mm. In each of the particular embodiments depicted in FIGS. 4-7, the channels have a height of about 3 mm, though one skilled in the art will appreciate that this dimension may vary from one embodiment to another and may be application specific.

Figure 8:
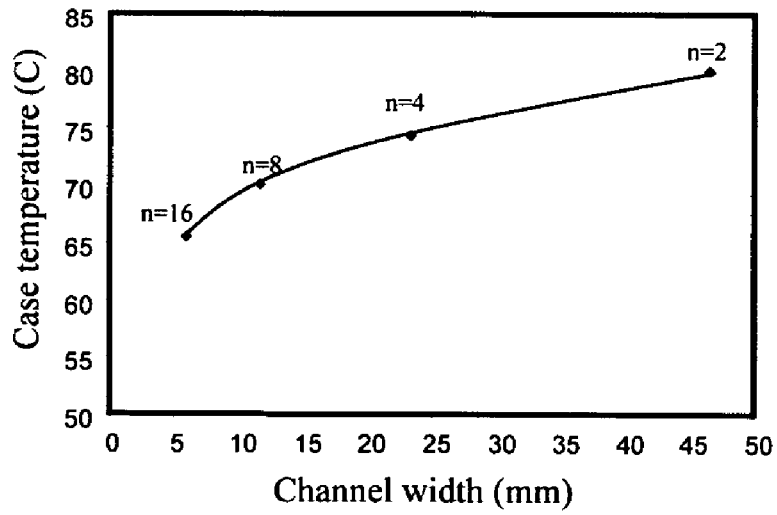
FIG. 8 is a graph of case temperature as a function of channel width.

The effect of channel width (and therefore the number of channels) on heat dissipation is illustrated in FIG. 8. The graph shown therein is based on the results of mathematical modeling studies performed on cases for laptop computers, with the cases having the structures depicted in FIGS. 4-7. The model assumed a fixed heat transfer coefficient of 25 W/m$^2$K, and that the total power to be dissipated was 18 W, which corresponds to a typical device operation of about 90 W.

As seen therein, case temperature drops significantly with an increase in the number of channels, and a corresponding decrease in channel width. Thus, with two channels (each having a width of about 45 mm), the exterior case temperature reached about 80° C. Increasing the number of channels to 4

(and correspondingly decreasing the channel width to about 22 mm) lowered the exterior case temperature to about 74° C. Further increasing the number of channels to 8 (and correspondingly decreasing the channel width to about 11 mm) lowered the exterior case temperature to about 70° C. Finally, increasing the number of channels to 16 (and correspondingly decreasing the channel width to about 5 mm) lowered the exterior case temperature to about 66° C. It is to be noted here that these results are achievable, in part, by the unique ability of synthetic jets to compensate for the increase in flow resistance that would otherwise attend a reduction in channel dimensions.

Figure 9:
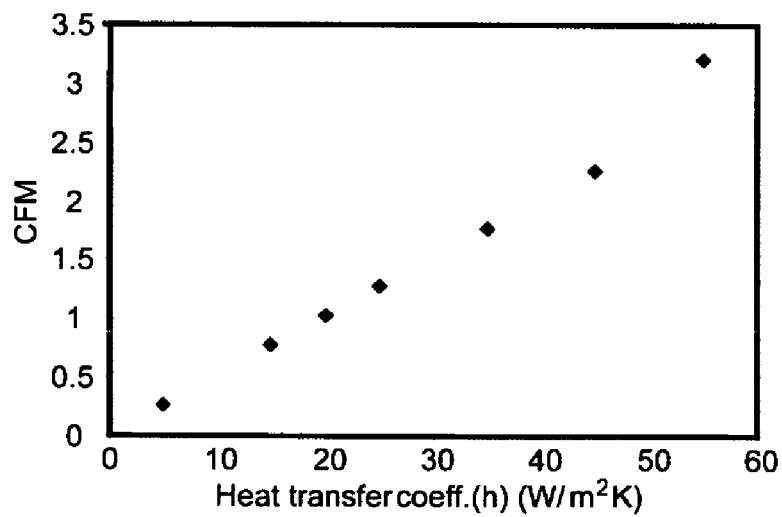
FIG. 9 is a graph of flow rate (CFM) as a function of heat transfer coefficient.

FIG. 9 is a graph of flow rate (in cubic feet per minute (CFM)) as a function of heat transfer coefficient for a heat exchanger of the type depicted in FIGS. 2-3. As seen therein, in order to attain a desired thermal objective, the flow rate of fluid through the heat exchanger will typically have to increase as the heat transfer coefficient increases. It is thus desirable in many applications to use materials such as metals and graphite which have high thermal conductivities for the interior segment 211 (see FIG. 2) of the heat exchanger.

Figure 10:
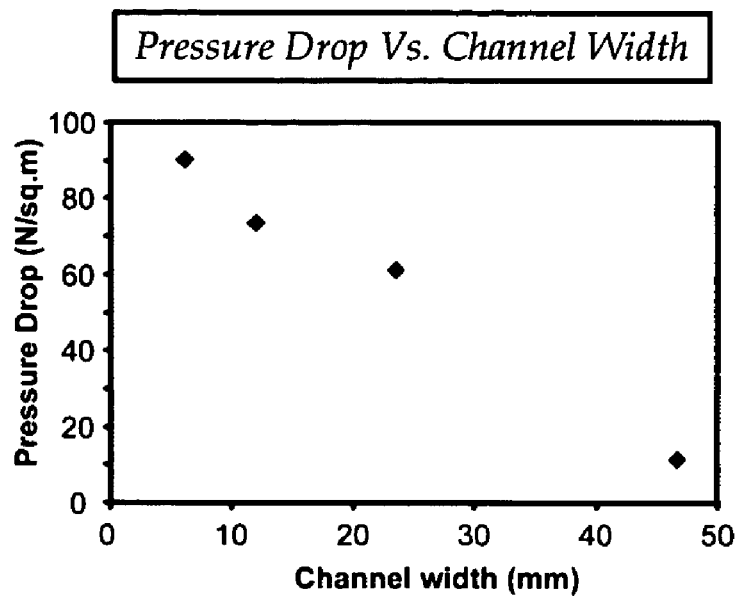
FIG. 10 is a graph of pressure drop as a function of channel width.

FIG. 10 is a graph of pressure drop as a function of channel width for a heat exchanger of the type depicted in FIGS. 2-3. As seen therein, pressure decreases significantly with channel width. Thus, for a device of the type depicted in FIG. 4 which has two channels (each having a width of about 45 mm), the channel pressure is about 10 $N/m^2$. For a device of the type depicted in FIG. 5 which has four channels (each having a width of about 22 mm), the channel pressure is about 60 $N/m^2$. For a device of the type depicted in FIG. 6 which has eight channels (each having a width of about 11 mm), the channel pressure is about 70 $N/m^2$. For a device of the type depicted in FIG. 7 which has sixteen channels (each having a width of about 5 mm), the channel pressure is about 60 $N/m^2$. Hence, the need for flow augmentation of the type provided by synthetic jets becomes more critical as the number of channels increases and channel width decreases. One skilled in the art will appreciate that the optimum channel dimensions for a particular application may thus be chosen with consideration of the amount of heat to be dissipated, the flow augmentation available with the synthetic jet ejector, the heat transfer coefficient of the material of the heat exchanger, and other such factors.

Figure 11:
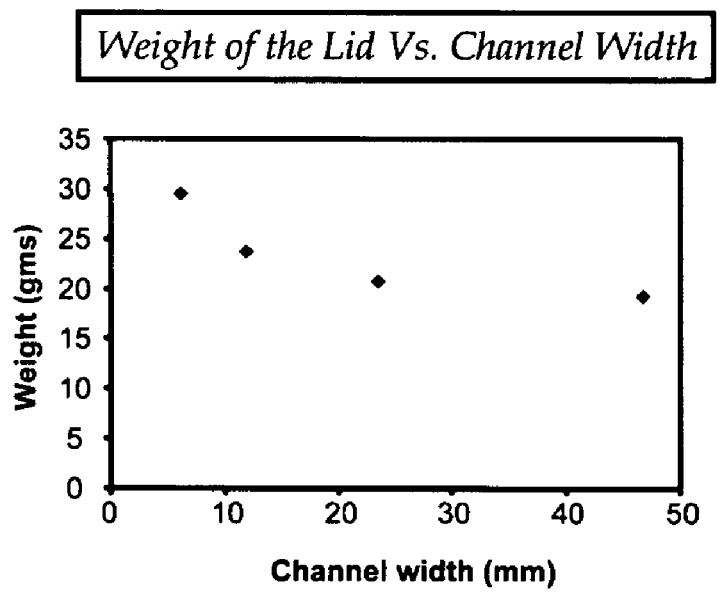
FIG. 11 is a graph of case weight as a function of channel width.

FIG. 11 illustrates the effect of channel width on the weight of a device for a particular embodiment of the heat exchanger of the type depicted in FIGS. 2-3. Thus, for an exemplary heat exchanger having the configuration depicted in FIG. 4 (which has two channels, each having a width of about 45 mm), the weight of the device is about 20 g. For an exemplary heat exchanger of the type depicted in FIG. 5 (which has four channels, each having a width of about 22 mm), the weight of the device is about 22 g. For an exemplary heat exchanger of the type depicted in FIG. 6 (which has eight channels, each having a width of about 11 mm), the weight of the device is about 24 g. For an exemplary heat exchanger of the type depicted in FIG. 7 (which has sixteen channels, each having a width of about 5 mm), the weight of the device is about 30 g. It is thus seen that, with respect to the device depicted in FIGS. 2-3, there is a weight penalty associated with increasing the number of channels, due in part to the increased number of channel partitions. In designing a heat exchanger for a particular application, this weight penalty must be considered in light of the other benefits and drawbacks attendant to an increase in the number of channels.

Figure 12:
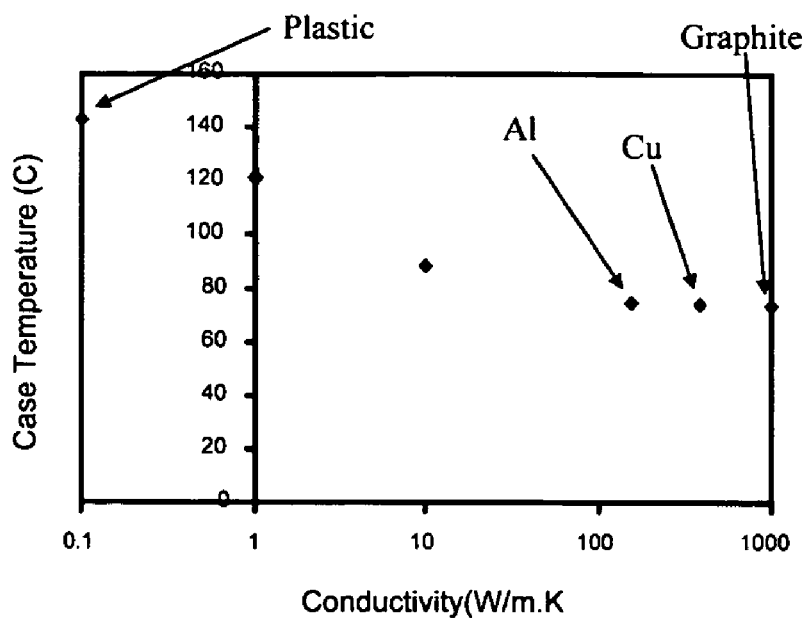
FIG. 12 is a graph of case temperature as a function of conductivity.

FIG. 12 illustrates the effect of thermal conductivity of the case material on the case temperature. As seen therein, the use of case materials such as aluminum, copper or graphite in the interior component 211 (see FIG. 2) of the case allows the exterior case temperature to be maintained at about 70° C. (assuming a 4-channel heat exchanger of the type depicted in FIG. 5), which is well within ergonomically acceptable ranges for many applications. By contrast, the use of thermally insulating materials such as non-thermally conductive plastics increases the exterior case temperature about two-fold to 140° C.

Figure 13:
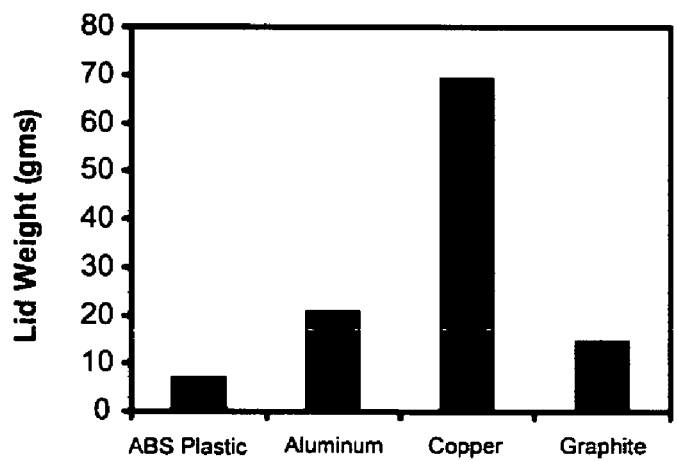
FIG. 13 is a graph of case weight as a function of material.

FIG. 13 illustrates the effect of materials choice on the weight of the case. As seen therein, plastics (i.e., ABS) provide the most light-weight construction at about 8 grams. The use of graphite increases the weight of the casing to about 17 g, while the use of aluminum increases the weight to about 20 g. For comparison, a copper construction would yield a casing that weighs about 70 g. It should be noted that the foregoing assumes that the entire casing is made of the noted material. However, one skilled in the art will appreciate that the advantages of thermal conductivity (and the previously noted reduction in exterior casing temperatures) and lighter weight casings can be achieved by making the casing with a two-component or multi-component construction of the type depicted in FIGS. 2-3. In such a construction, only the interior component 211 is required to be thermally conductive, thus significantly reducing the weight penalty associated with the use of heavier, thermally conductive materials.

Figure 14:
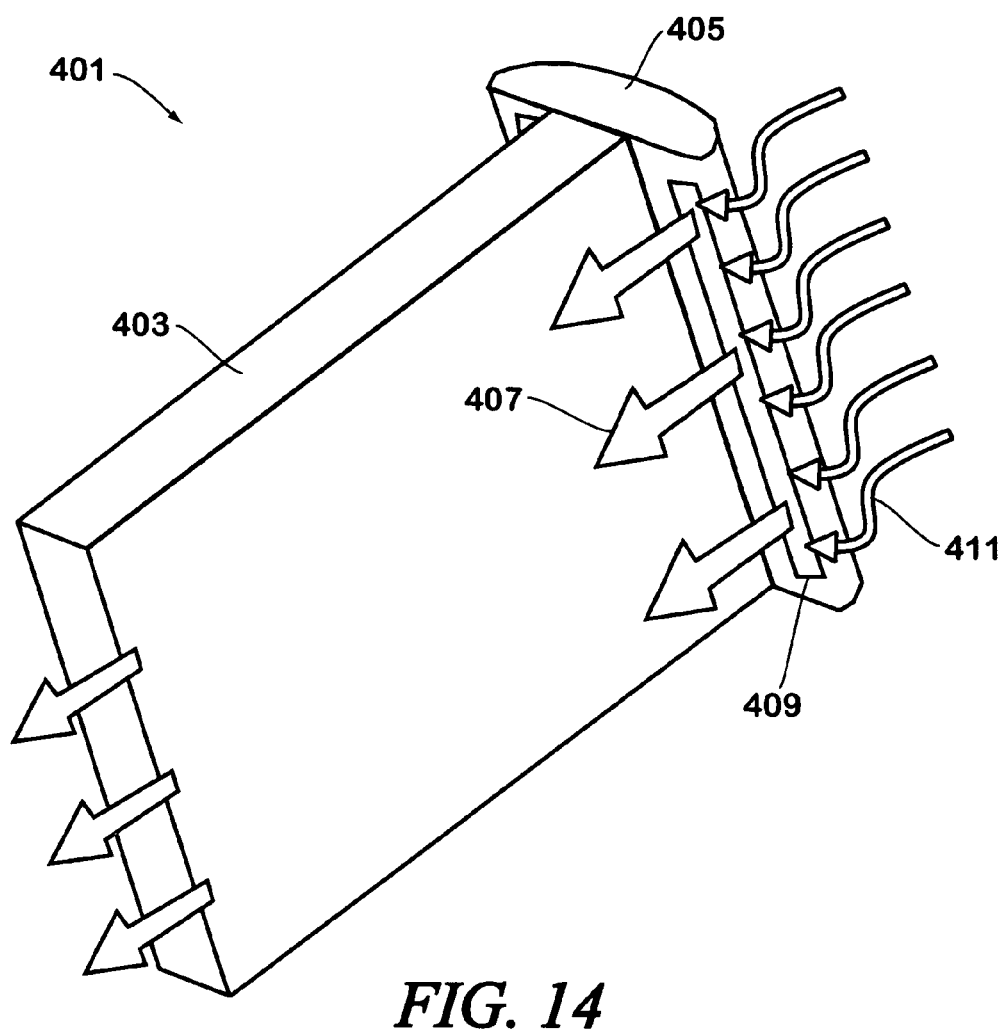
FIG. 14 is an illustration of a battery module equipped with a thermal management system of the type described herein.

FIG. 14 illustrates a second, non-limiting embodiment of a thermal management system of the type disclosed herein which is suitable for use in dissipating heat from a battery module. The system 401 comprises a battery module 403 which contains one or more batteries. Rather than utilizing a channeling scheme as is the case with the device of FIGS. 2-3, in this embodiment, a synthetic jet ejector 405 is mounted on one end of the battery module 403 and is adapted to direct a plurality of synthetic jets along one or more surfaces of the battery module 403, as indicated by the first set of arrows 407. A series of apertures 409 or nozzles are provided on a surface of the synthetic jet ejector 405 adjacent to each major surface of the battery module 403 for this purpose. As indicated by the second set of arrows 411 in FIG. 14, the synthetic jets created by the synthetic jet ejector 405 cause entrainment of the ambient fluid, thus improving the efficiency of heat transfer from the surfaces of the battery module 403 to the ambient environment.

Figure 15:
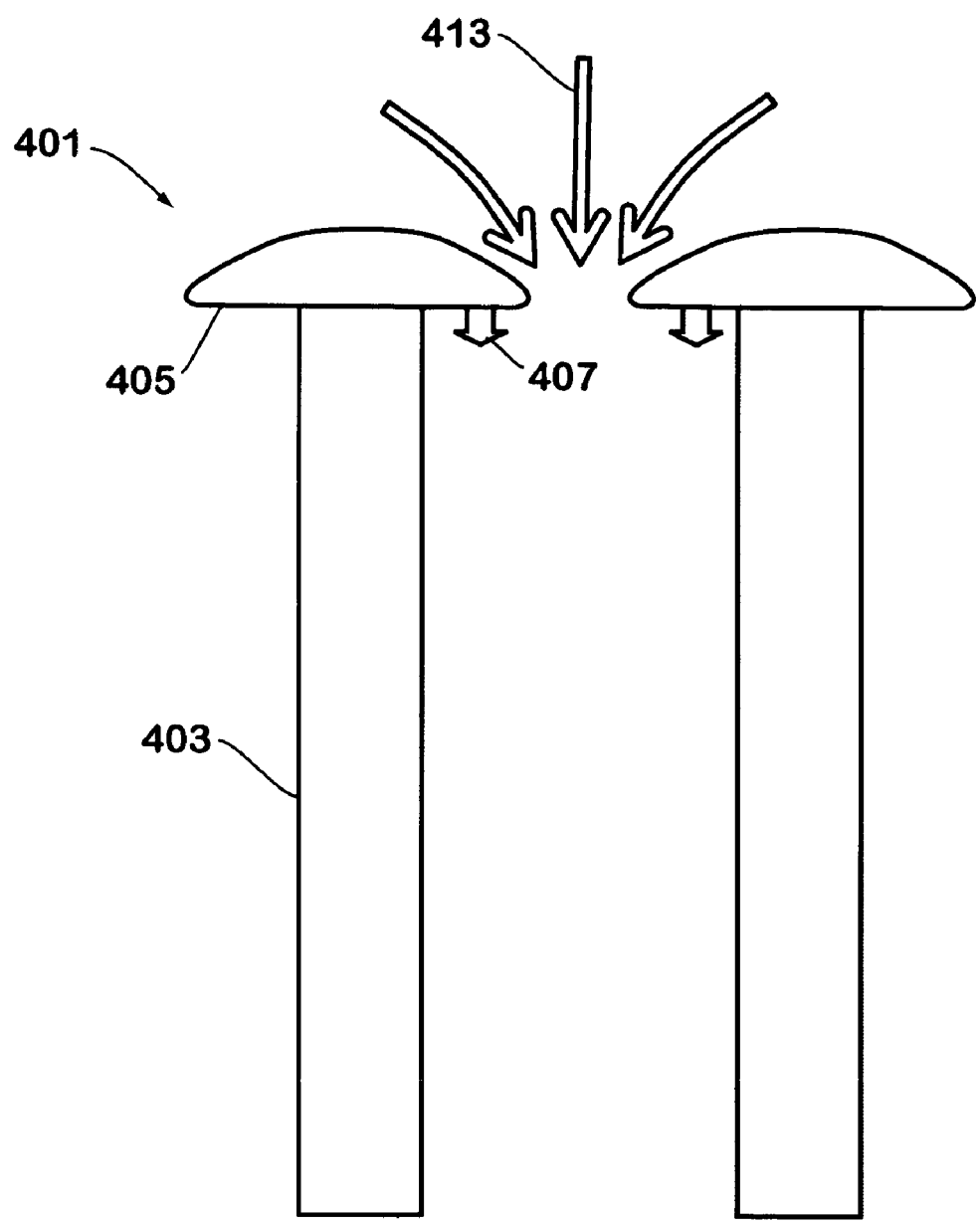
FIG. 15 is an illustration of an assembly of battery modules of the type depicted in FIG. 14.

As shown in FIG. 15, battery modules 403 of the type depicted in FIG. 14 may be assembled in parallel. One advantage of this type of arrangement is that the resulting entrainment of the ambient fluid, indicated in FIG. 15 by arrows 413, results in a turbulent flow of the fluid medium through the space between adjacent battery modules 403, thus resulting in a more efficient transfer of heat between the surfaces of the battery modules 403 and the ambient environment.

Figure 16:
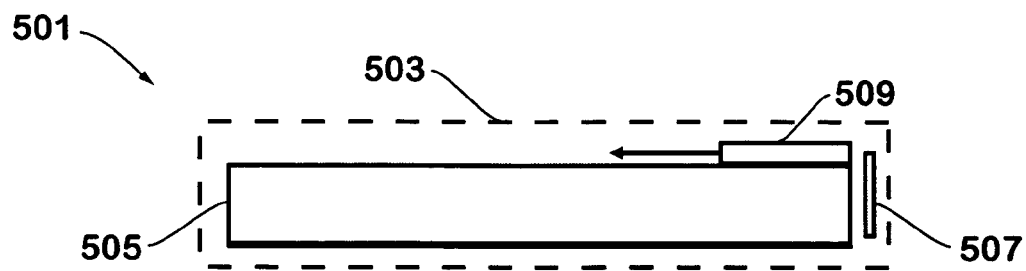
FIG. 16 is an illustration of a battery module equipped with a thermal management system of the type described herein.

FIG. 16 illustrates another possible, non-limiting embodiment of a thermally managed battery module made in accordance with the teachings herein. The device 501 depicted therein comprises a casing 503 which contains a battery module 505 and associated circuitry 507. The battery module 505 has a synthetic jet actuator 509 mounted on a surface thereof. The casing 503 may contain one or more vents to permit fluid flow between the interior and exterior of the casing 503.

Figure 17:
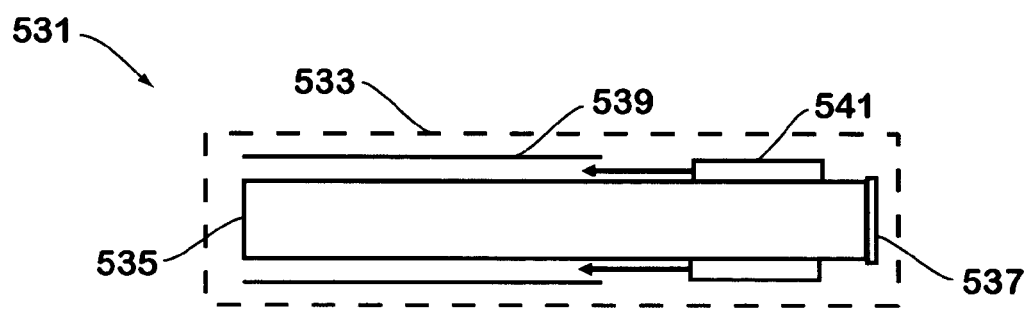
FIG. 17 is an illustration of a battery module equipped with a thermal management system of the type described herein.

FIG. 17 illustrates yet another possible, non-limiting embodiment of a thermally managed battery module made in accordance with the teachings herein. The device 531 depicted therein, which is similar in many respects to the device depicted in FIG. 16, comprises a casing 533 which contains a battery module 535 and associated circuitry 537. In contrast to the device depicted in FIG. 16, however, the device depicted in FIG. 17 utilizes a channeling scheme 539 similar to that depicted in FIGS. 2-3, in conjunction with a surface mounted synthetic jet actuator 541, to create a flow of fluid over the surfaces of the battery module 535, thereby maintaining the battery modules within a desired temperature range.

Figure 18:
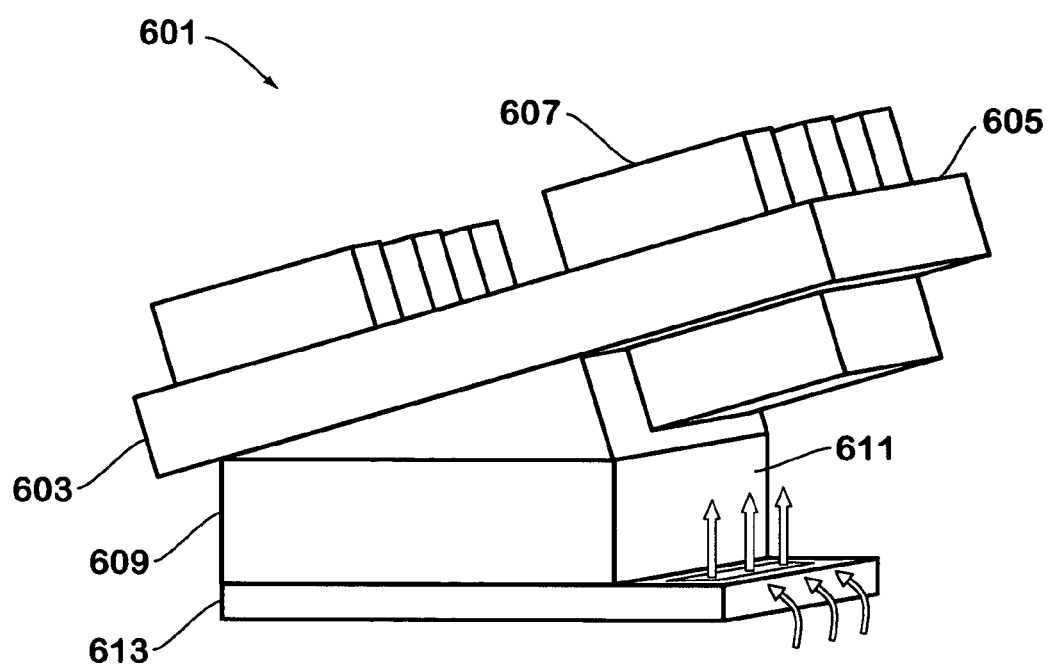
FIG. 18 is an illustration of a battery charger equipped with a thermal management system of the type depicted herein.

While much of the discussion above has focused on the thermal management of battery modules, one skilled in the art will appreciate that the teachings disclosed herein are not limited to battery modules, but are applicable to the thermal management of a wide variety of devices. Thus, for example, FIG. 18 illustrates one particular, non-limiting embodiment of the application of a synthetic jet ejector of the type disclosed herein to a battery charger 601. The battery charger 601 comprises a platform 603 which has an upper surface 605 that has a series of ports therein (not shown), each of which is adapted to accept a battery 607 or battery pack for charging. The base 609 of the battery charger 601 contains a power supply which is in electrical communication with the ports defined in the upper surface 605 of the platform 603.

The base 609 is equipped with a planar surface for supporting the battery charger on a substrate. The platform 603 is preferably supported at an angle to the planar surface. Preferably, this angle is within the range of about 15° to about 75°, and more preferably, this angle is within the range of about 30° to about 60°.

In the particular embodiment of the battery charger depicted in FIG. 18, significant heating occurs during the normal charge and discharge cycles attendant to the operation of the device such that, if no thermal management measures are taken, the temperature of the (typically aluminum) front surface 611 of the base 603 is about 68° C., which is well above the critical limit of 55° C. dictated by end-user ergonomics. Moreover, the device is found to lose capacity when the temperature of this component exceeds 65° C.

The base 609 of the device includes a base plate 613. The base plate contains a synthetic jet ejector that is adapted to eject a plurality of synthetic jets (indicated by the larger arrows) along the front surface 611 of the chassis 603. The formation of the synthetic jets causes entrainment of the ambient fluid (indicated by the smaller arrows). Operation of the synthetic jet ejector is found to reduce the temperature of the front surface 611 of the base 603 such that it is in an ergonomically acceptable range.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A battery charger, comprising:
a base having a synthetic jet ejector disposed therein;
a platform supported on said base; and
a charging station incorporated into said platform, said charging station having a first major surface which is adapted to receive and charge at least one battery;
wherein said base has a planar surface for supporting said battery charger on a substrate, wherein said platform is disposed at an angle to said planar surface, wherein said charging station is powered by electrical circuitry disposed in said base, and wherein said synthetic jet ejector is adapted to direct a plurality of synthetic jets along a surface of said base.

2. The battery charger of claim 1, wherein said first major surface is spaced apart from said base.

3. The battery charger of claim 1, wherein said angle is within the range of about 15° to about 75°.

4. The battery charger of claim 1, wherein said angle is within the range of about 30° to about 60°.

5. The battery charger of claim 1, wherein said charging station has a first major surface which is adapted to receive and charge a plurality of batteries.

6. The battery charger of claim 5, wherein said first major surface is open to the ambient environment.

7. The battery charger of claim 1, wherein said base is supported on a plate, and wherein said plate has a plurality of apertures therein.

8. The battery charger of claim 7, wherein said plurality of apertures are in fluidic communication with a synthetic jet actuator.

9. The battery charger of claim 7, wherein said synthetic jet ejector is adapted to direct a plurality of synthetic jets along a surface of said base which is perpendicular to said base plate.

10. The battery charger of claim 7, wherein said plurality of apertures are spaced apart from the surface of said base.

11. The battery charger of claim 10, wherein said plate has a first portion which is covered by said base and a second portion which is not covered by said base, and wherein said plurality of apertures are disposed in said second portion of said plate.

12. The battery charger of claim 1, in combination with a battery, wherein said battery is disposed on said first major surface.

13. The battery charger of claim 1, in combination with a plurality of batteries, wherein said plurality of batteries are disposed on said first major surface.

14. The battery charger of claim 13, wherein said batteries are arranged in parallel on said first major surface.

15. The battery charger of claim 1, wherein said platform has a second major surface, and wherein said first and second major surfaces of said platform are opposing surfaces.

* * * * *